United States Patent [19]

Matsushita

[11] 4,147,058
[45] Apr. 3, 1979

[54] ELECTROMAGNETIC FLUID FLOWMETER OPERABLE WITH FREE FLUID SURFACE

[75] Inventor: Shigetada Matsushita, Kawasaki, Japan

[73] Assignee: Fuji Electric Co., Ltd., Kawasaki, Japan

[21] Appl. No.: 793,910

[22] Filed: May 4, 1977

[30] Foreign Application Priority Data

May 6, 1976 [JP] Japan ................................. 51-51540

[51] Int. Cl.² ............................................. G01F 1/58
[52] U.S. Cl. .............................................. 73/194 EM
[58] Field of Search ................................. 73/194 EM

[56] References Cited

U.S. PATENT DOCUMENTS

| 3,589,186 | 6/1971 | Bourg et al. ................... 73/194 EM |
| 3,991,612 | 11/1976 | Mannherz et al. ............. 73/194 EM |
| 4,036,052 | 7/1977 | Searle ............................. 73/194 EM |

Primary Examiner—Charles A. Ruehl
Attorney, Agent, or Firm—Sughrue, Rothwell, Mion, Zinn and Macpeak

[57] ABSTRACT

An electromagnetic fluid flowmeter wherein two arc-shaped, circular segment electrode plates $B_1$, $B_2$ are disposed horizontally opposite each other on the internal periphery of a tubular conduit M, and are separated by vertically opposed, convex insulators $D_1$, $D_2$. The respective dimensional relationships of the electrode plates and insulators, and the flux pattern of the magnetic field within the conduit, are geometrically determined and configured such that the induced current flow between the electrode plates is always proportional to the fluid flow rate, even when a free fluid surface exists within the conduit and regardless of the level of the free surface.

5 Claims, 6 Drawing Figures

ELECTROMAGNETIC FLUID FLOWMETER OPERABLE WITH FREE FLUID SURFACE

BACKGROUND OF THE INVENTION

This invention relates to an electromagnetic flowmeter capable of accurately measuring the flow rate of a fluid passing through a circular conduit even when the fluid does not fill the conduit but has a free surface.

In conventional electromagnetic flowmeters which utilize a voltage induced between a pair of point electrodes located opposite each other on the wall of a measuring tube as a flow rate signal, it is assumed that the flowing fluid fully fills the tube, and the meter readings are not valid or accurate when the tube is only partially filled, i.e. when the fluid has a free surface.

SUMMARY OF THE INVENTION

An object of this invention is thus to provide an electromagnetic flowmeter capable of measuring the flow rate of a fluid passing through a conduit when the fluid has a free surface as well as when the fluid completely fills the conduit.

According to this invention the above object can be realized by the provision of a circular measuring tube, a pair of arc-shaped electrodes disposed opposite each other in the tube, and a pair of arc-shaped insulating bodies disposed in the tube between the electrodes for electrically insulating them from each other. A magnetic field whose flux density component along a specified direction is a function of position within a cross-section of the measuring tube is formed in the tube, and a current signal taken from the pair of electrode plates serves as the output signal.

In a preferred embodiment of this invention, where the measuring tube is a cylinder having a radius a and a pair of insulating bodies are located on the X axis of X-Y coordinates, the configuration of a pair of arc-shaped electrode plates is represented by the equation:

$$Im\{\log (z+a/z-a)\} = \eta$$

where $z = x + jy$ and $\eta$ is selected to be a certain value.

Similarly, the configuration of a pair of arc-shaped insulating bodies is represented by the equation:

$$Re\{\log (z+a/z-a)\} = \xi,$$

where $\xi$ is selected to be a certain value.

The specified direction of the flux density component in the magnetic field corresponds to the direction of a line tangential to a circle represented by the equation:

$$Im\{\log (z+a/z-a)\} = \eta,$$

and the intensity of the component along the specified direction is selected so that it is proportional to the product $r_1 \times r_2$, where $r_1$ is the distance between the tangent point and point $(-a, 0)$ and $r_2$ is the distance between the tangent point and point $(+a, 0)$ on the X-Y coordinates.

DETAILED DESCRIPTION OF THE PREFERRED EMBODIMENT

Figure 1:
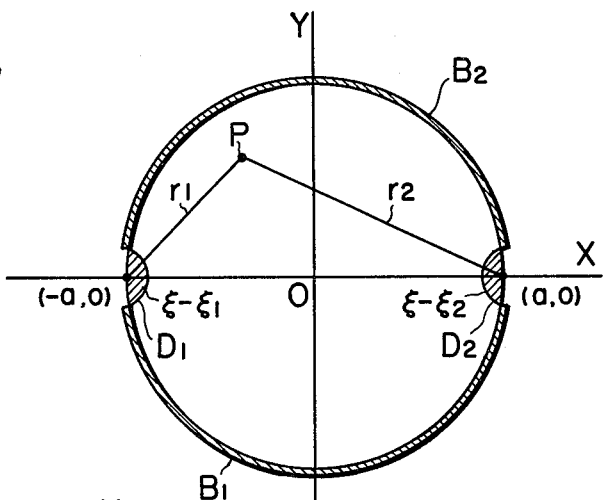
FIGS. 1, 2 and 3 show schematic, cross-section views for illustrating the basic concept of the invention.

This invention will now be described in detail by way of a preferred embodiment thereof referring to the drawings. The description will be made in the following order for a better understanding of the invention:

I. Configuration of electrode plates and introduction of curvilinear coordinates thereto II. Linear element and surface element in the curvilinear coordinates III. Measuring theory of the invention IV. A preferred structural embodiment of the invention

I. Configuration of the electrode plates and introduction of curvilinear coordinates thereto FIG. 1 is a conceptual view illustrating the relationship between the configuration of a pair of electrode plates and the configuration of a pair of insulating bodies according to the invention. $B_1$ and $B_2$ denote a pair of electrode plates whose inner surfaces are shaped in the form of an arc having a radius a. $D_1$ and $D_2$ denote a pair of insulating bodies for electrically insulating the electrode plates from each other, and their inner surfaces are also arc shaped. The arc centers of the electrode plates are located at the origin (0, 0) and the arc centers of the insulating bodies are located on the X axis.

A description will now be given of the arc shapes of the inner surfaces of the electrode plates and the insulating bodies.

Figure 2:
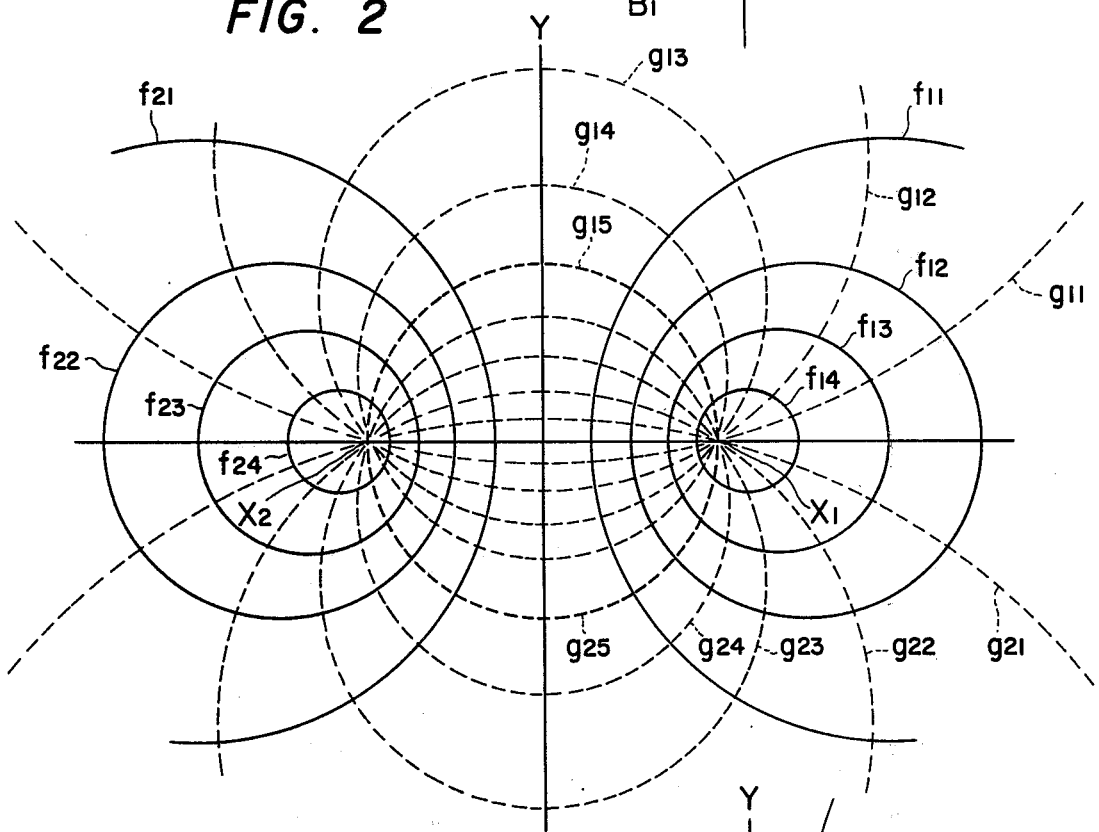

First, the X-Y coordinates of FIG. 1 are plotted in FIG. 2 and points $X_1 (a, 0)$ and $X_2 (-a, 0)$ are placed thereon. Contour mapping is then performed to represent the inner area of a circle having a radius a according to the curvilinear coordinates $(\xi, \eta)$ given in equation (1):

$$f(z) = \log \frac{z+a}{z-a} = \xi + j\eta \qquad (1),$$

wherein z is represented by equation (2) as:

$$z = x + jy \qquad (2)$$

The above representation is divided into real and imaginary parts with respect to $\xi$ and $\eta$ as follows:

$$\xi = Re\left\{ \log \frac{z+a}{z-a} \right\} = \tfrac{1}{2}\log \frac{(x+a)^2 + y^2}{(x-a)^2 + y^2} \qquad (3)$$

$$\eta = Im\left\{ \log \frac{z+a}{z-a} \right\} = \tan^{-1}\left( -\frac{2ay}{x^2 - a^2 + y^2} \right) \qquad (4)$$

Equation (3) is transformed into equation (6) below based on equation (5) below. Taking $\xi$ as a parameter in equation (6), the locii represented by equation (6) forms a family of circles on a common axis each having a center on the X axis. The circle is reduced to the point $X_2 (-a, 0)$ in FIG. 2 when $\xi$ equals $-\infty$ in equation (6), forms a family of circles whose radii increase as $\xi$ gradually increases from negative $\infty$ to zero, as shown by $f_{24}$, $f_{23}$, $f_{22}$ and $f_{21}$, and finally forms a circle of infinite radius coincident with the Y axis when $\xi$ becomes zero. As $\xi$ further increases in the positive direction in equation (5), the locus forms a family of circles whose radii decrease gradually as shown by $f_{11}$, $f_{12}$, $f_{13}$ and $f_{14}$, and finally lies on the point $X_1$ (a, 0) when $\xi$ equals $+\infty$.

$$\exp(2\xi) = \frac{(x+a)^2 + y^2}{(x-a)^2 + y^2} \tag{5}$$

$$y^2 + \left\{x - a\frac{\exp(2\xi)+1}{\exp(2\xi)-1}\right\}^2 = \left\{\frac{2a}{\exp(2\xi)-1}\right\}^2 \times \exp(2\xi) \tag{6}$$

or $$y^2 + (x-x_0)^2 = x_0^2 - a^2 \tag{6'}$$

where $x_0 = a[\exp(2\xi)+1/\exp(2\xi)-1]$

Equation (4) may be transformed into equation (7) as follows:

$$\left(y + \frac{a}{\tan\eta}\right)^2 + x^2 = a^2\left(1 + \frac{1}{\tan^2\eta}\right) \tag{7}$$

or $$(y+y_0)^2 + x^2 = a^2 + y_0^2 \tag{7'}$$

where $y_0 = a/\tan\eta$

Taking $\eta$ as a parameter in the equation (7), the locii represented by equation (7) forms a family of circles on a common axis each always including the points $X_1(a, 0)$ and $X_2(-a, 0)$ and having a center on the Y axis. That is, the locus forms a circle represented by $g_{25}$ having its center at the origin (0, 0) and a radius a when $\eta$ equals $-\pi/2$, forms a family of circles whose radii gradually increase as shown by circles $g_{14}$, $g_{13}$, $g_{12}$ and $g_{11}$ as $\eta$ increases from $-\pi/2$ to 0, coincides with the X axis when $\eta$ equals zero, forms a family of circles as shown by $g_{21}$, $g_{22}$, $g_{23}$ and $g_{24}$ when $\eta$ increases in the positive direction, and finally forms a circles represented by $g_{15}$ having a radius a and its center at the origin (0, 0) when $\eta$ equals $\pi/2$.

The arc of the inner surface of the insulating body $D_1$ is represented by equation (6) where $\xi=\xi_1$, and the locus thereof is shown by the circle $f_{24}$. The arc of the inner surface of the insulating body $D_2$ is represented by equation (6) where $\xi=\xi_2$, and the locus thereof is shown by the circle $f_{14}$. The arc of the inner surface of the electrode plate $B_1$ is represented by equation (7) where $\eta=-\pi/2$, and the locus thereof is shown by the circle $g_{25}$. The arc of the inner surface of the electrode plate $B_2$ is represented by equation (7) where $\eta=\pi/2$, and the locus thereof is shown by the circle $g_{15}$.

In the contour map of FIG. 2, each of the f family of circles orthogonally crosses each of the g family of circles.

The configuration of the free surface of the fluid, which is described hereafter, is assumed to be that obtained when $\xi=\xi_3$.

II. Linear element and surface element in the curvilinear coordinates

Figure 3:
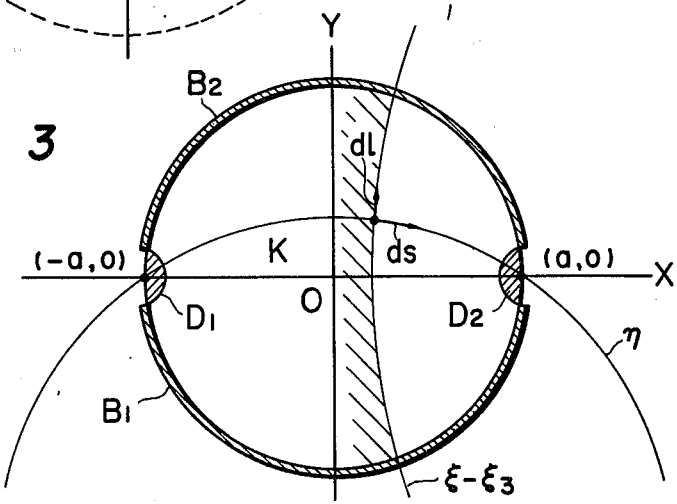

As shown in FIG. 3, it is assumed that a linear element is represented by a curve ds wherein $\eta$ is a constant, and another linear element is represented by a curve dl wherein $\xi$ is a constant. The linear elements ds and dl are represented by equations (8) and (9) as follows:

$$ds = 1/h_1 d\xi \tag{8}$$

$$dl = 1/h_2 d\eta \tag{9}$$

wherein $h_1$ and $h_2$ are respectively represented by equations (10) and (11) as follows:

$$h_1 = \sqrt{\left(\frac{\delta\xi}{\delta x}\right)^2 + \left(\frac{\delta\xi}{\delta y}\right)^2} \tag{10}$$

$$h_2 = \sqrt{\left(\frac{\delta\eta}{\delta x}\right)^2 + \left(\frac{\delta\eta}{\delta y}\right)^2} \tag{11}$$

The surface element dN is represented by equation (12) as follows:

$$dN = ds\,dl = 1/h_1 h_2 d\xi d\eta \tag{12}$$

The Cauchy-Riemann differential equations (13) and (14) below apply to the regular complex function f(z):

$$\partial\xi/\partial x = \partial\eta/\partial y \tag{13}$$

$$\partial\xi/\partial y = -\partial\eta/\partial x \tag{14}$$

Equations (13) and (14) can thus be substituted into equations (10) and (11), respectively, to obtain:

$$h_1 = h_2 = \sqrt{\left(\frac{\delta\xi}{\delta x}\right)^2 + \left(\frac{\delta\eta}{\delta x}\right)^2} = h \tag{15}$$

Thus, $h_1$ and $h_2$ are the same, and may be represented simply by h.

The differential coefficient f'(z) for the regular function f(z) is as follows:

$$f'(z) = \frac{\delta\xi}{\delta x} + j\frac{\delta\eta}{\delta x} \tag{16}$$

Applying equation (16) to equation (1), h can be determined from equation (15) as follows:

$$h = |f'(z)| = \left|\frac{1}{z+a} - \frac{1}{z-a}\right| = \frac{2a}{|z+a||z-a|} \tag{17}$$

Assuming that the distances between points $X_1$ and $X_2$ and a point P (x, y) are $r_1$ and $r_2$, respectively, as shown in FIG. 1, equation (17) can be expressed as:

$$h = \frac{2a}{r_1 \cdot r_2} \tag{18}$$

III. Measuring theory of the invention

The theory of measurement of the invention will now be described with reference to the curvilinear coordinates ($\xi$, $\eta$) described above. The fundamental equation for an electromagnetic flowmeter is:

$$\vec{i} = \sigma(-\text{grad}\,U + \vec{V} \times \vec{B}) \tag{19}$$

where $\vec{i}$ is the current density,
  $\sigma$ is the conductivity of the fluid (assumed here to be a uniform value),
  U is the electrical potential,
  $\vec{V}$ is the flow velocity (assumed here to be only in the axial direction of the measuring tube), and $\overline{B}$ is the magnetic flux density.

It is assumed herein that there are no changes in the axial direction of the measuring tube, and the following discusseion will be made only with reference to the two dimensional changes in the X-Y plane. Taking only the dl component on the curvilinear coordinates into consideration, equation (19) is transformed into:

$$\frac{il}{\sigma} = -\frac{\delta U}{\delta l} + BsV \quad (20),$$

where il is the dl component of $\overline{i}$, and Bs is the ds component of $\overline{B}$. If both sides of equation (20) are multiplied by 1/h and double integration is carried out for the area K ($\xi_1 \leq \xi \leq \xi_3$, $-\pi/2 \leq \eta \leq \pi/2$), the entire inside of the measuring tube in which fluid is present is represented, as shown in FIG. 3. The free surface of the fluid is represented by $\xi = \xi_3$, and is actually horizontal rather than being arc-shaped as shown. The difference is negligible, however, in actual measurement.

$$\int_{-\frac{\pi}{2}}^{\frac{\pi}{2}} \int_{\xi_1}^{\xi_3} \frac{il}{\sigma} \cdot \frac{1}{h} d\xi d\eta = \int_{-\frac{\pi}{2}}^{\frac{\pi}{2}} \int_{\xi_1}^{\xi_3} \left(-\frac{\delta U}{\delta l}\right) \frac{1}{h} d\xi d\eta + \int_{-\frac{\pi}{2}}^{\frac{\pi}{2}} \int_{\xi_1}^{\xi_3} V \frac{Bs}{h} d\xi d\eta \quad (21)$$

The basic operation is represented by the first term on the right side of equation (21), which, from equation (9), becomes:

$$\int_{-\frac{\pi}{2}}^{\frac{\pi}{2}} \frac{\delta U}{\delta l} \cdot \frac{1}{h} d\eta = \int_{-\frac{\pi}{2}}^{\frac{\pi}{2}} \frac{\delta U}{\delta l} dl = U \Big|_{\eta=-\frac{\pi}{2}}^{\eta=\frac{\pi}{2}} \quad (22)$$

The voltage shown by equation (22) is the potential difference produced between the electrode plates $B_1$ and $B_2$.

The employment of a measuring system in which a current detector having an extremely low input resistance is connected between the electrode plates $B_1$ and $B_2$ makes the potential difference between the electrode plates $B_1$ and $B_2$ almost zero, and equation (22) can therefore be rewritten as:

$$\int_{-\frac{\pi}{2}}^{\frac{\pi}{2}} \frac{\delta U}{\delta l} \cdot \frac{1}{h} d\eta = 0 \quad (23)$$

Reference is also made to the left side of equation (21), which, from equation (8), becomes:

$$\int_{\xi_1}^{\xi_3} il \frac{d\xi}{h} = \int_{\xi_1}^{\xi_3} ilds \quad (24)$$

Since the right side of equation (24) represents the sum of the current components perpendicular to the ds curve where $\eta$=constant, and no current escapes from the insulating body $D_1$ and free surface of the fluid defined by $\xi = \xi_3$, the right side of equation (24) is equal to the current value I flowing between the electrode plates $B_1$ and $B_2$. Equation (24) can therefore be rewritten as:

$$\int_{\xi_1}^{\xi_3} il \frac{d\xi}{h} = I \quad (25)$$

Substituting equations (23) and (25) into equation (21) gives:

$$\frac{I}{\sigma} \int_{-\frac{\pi}{2}}^{\frac{\pi}{2}} d\eta = \int_{-\frac{\pi}{2}}^{\frac{\pi}{2}} \int_{\xi_1}^{\xi_3} V \frac{Bs}{h} d\xi d\eta \quad (26)$$

If the magnetic flux density Bs is such that its value in the direction of ds is proportional to 1/h as shown in equation (27), then equation (26) may be transformed into equation (31) in view of equation (12) for a surface element dN, as follows:

$$Bs = \frac{k}{h} = k \frac{r_1 \cdot r_2}{2a}, \quad (27)$$

That is, the left side of equation (26) is first transformed to:

(28)

$$\frac{I}{\sigma} \int_{-\frac{\pi}{2}}^{\frac{\pi}{2}} d\eta = \frac{I}{\sigma} (\eta) \Big|_{-\frac{\pi}{2}}^{\frac{\pi}{2}} = \pi \frac{I}{\sigma},$$

and the right side of equation (26) is transformed to:

$$\int_{-\frac{\pi}{2}}^{\frac{\pi}{2}} \int_{\xi_1}^{\xi_3} V \frac{Bs}{h} d\xi d\eta = k \int_{-\frac{\pi}{2}}^{\frac{\pi}{2}} \int_{\xi_1}^{\xi_3} V \frac{1}{h^2} d\xi d\eta = \quad (29)$$

$$k \int_{-\frac{\pi}{2}}^{\frac{\pi}{2}} \int_{\xi_1}^{\xi_3} Vdsdl = kQ,$$

where the fluid flow rate Q is expressed by equation (30) for a free surface defined by $\xi = \xi_3$:

$$Q = \int_{-\frac{\pi}{2}}^{\frac{\pi}{2}} \int_{\xi_1}^{\xi_3} Vdsdl \quad (30)$$

From the foregoing, equation (26) can be expressed as:

$$\pi I/\sigma = kQ, \quad (31)$$

whereby:

$$I = k(1/\pi)\sigma Q \quad (32)$$

Thus, from equation (32), the current I flowing between the electrode plates $B_1$ and $B_2$ is proportional to the flow rate Q under free surface conditions and to the conductivity of the fluid when the magnetic flux density Bs at a point P in the direction of ds is proportional to the product of $r_1$ and $r_2$ as shown in the equation (27), and a current detector having an extremely low input resistance is used.

IV. Preferred structural embodiment of the Invention

Figure 4:
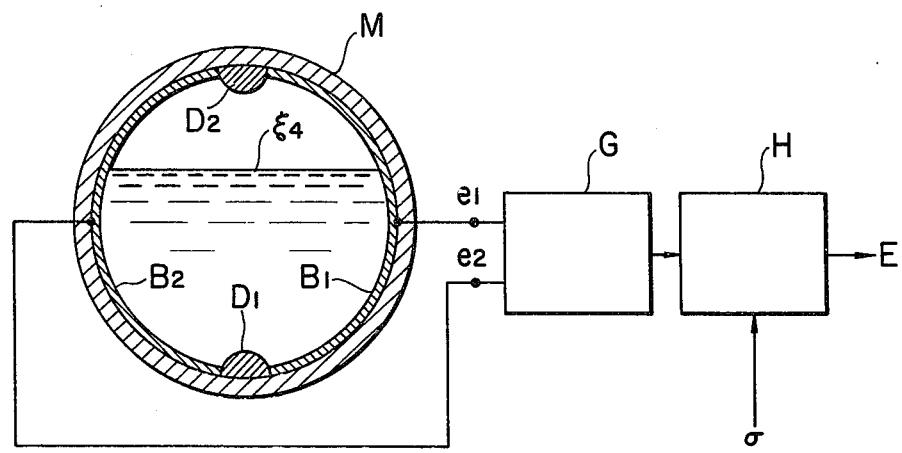
FIG. 4 shows a schematic diagram of the construction of a preferred embodiment of the invention.
Figure 5:
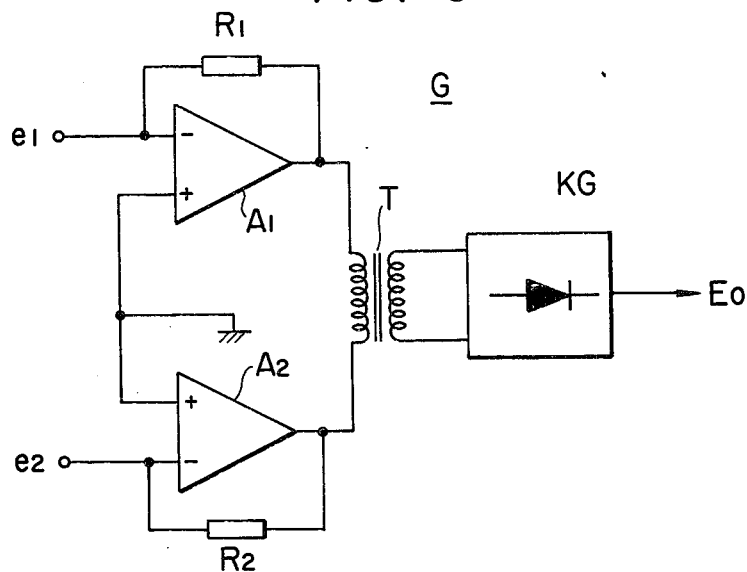
FIG. 5 shows a block diagram of a suitable current detector.

FIG. 4 and FIG. 5 are schematic views showing the construction of a preferred embodiment of the invention.

Insulating bodies $D_1$ and $D_2$ having an arc-shape based on equation (3), and electrode plates $B_1$ and $B_2$ having an arc shape based on equation (4), are respectively mounted in a measuring tube M. The electrode plates are electrically connected to input terminals $e_1$ and $e_2$ of a current detector G having an extremely low input resistance.

The current detector G may comprise, as shown in FIG. 5, two operational amplifiers $A_1$ and $A_2$ having resistors $R_1$ and $R_2$, respectively, a transformer T whose primary winding is connected to the outputs of the operational amplifiers, and a rectifying circuit KG connected to the secondary winding of the transformer. Output $E_O$ from the detector G represents the current I given by equation (32), which is fed to a divider H. The latter divides the current I by the conductivity $\sigma$ of the fluid, whereby the final output signal E is proportional only to the flow rate Q of the fluid, as follows:

$$E = I/\sigma = (k/\pi)Q \tag{33}$$

Accordingly, flow rate measurement for a fluid having a free surface is realized by supplying the output signal E from the divider H to an indicator, recorder or the like.

The thickness of the electrode plates $B_1$ and $B_2$ has no substantial effect, and where the measuring tube M is formed as a cylinder having a radius a the distance from the center of the cylinder to the inner surfaces of the electrode plates can also be approximated as a. In FIG. 4, $\xi_4$ designates the free surface of the fluid to be measured.

Figure 6:
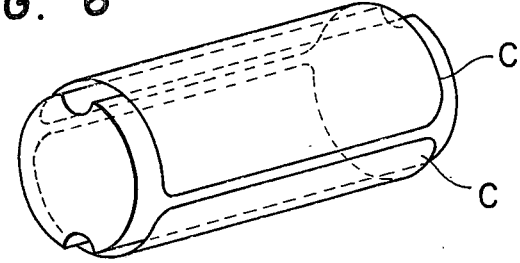
FIG. 6 shows a perspective view of appropriate magnetic field generating coils.

FIG. 6 shows a simplified perspective view of suitable coil configuration C for generating the magnetic field pattern shown in FIG. 2, such configurations being well known in the art.

What is claimed is:

1. An electromagnetic fluid flowmeter of the type comprising two arc-shaped electrode plates disposed horizontally opposite each other on the internal periphery of a tubular fluid conduit, means for establishing a magnetic field within the conduit the intensity of which in a given direction is a function of its position (x,y) in a cross-sectional plane of the conduit, and detecting means connected to the electrode plates for detecting the current flowing therebetween as a conductive fluid flows through the conduit, the improvement comprising a pair of convex electrically insulating members vertically disposed opposite each other on the internal periphery of the conduit and individually interposed between the respective adjacent edges of the electrode plates, the arcs of the inner surfaces of the electrode plates being defined by the following equation:

$$(y+y_o)^2 + x^2 = a^2 + y_o^2$$

which is the equation of a first family of circles through two poles $(-a,0)$ and $(a,0)$ in the rectangular coordinate system superimposed on said cross-sectional plane of the conduit with the center of the conduit located at the origin of the rectangular coordinate system, the arcs of the outer surfaces of said insulating members being defined by the following equation:

$$y^2 + (x-x_o)^2 = x_o^2 - a^2$$

which is the equation of a second family of circles orthogonal to those of the first family, said two families of circles defining a bipolar coordinate system and $y_o$ and $x_o$ being predetermined constants for a given combination of electrode plates and insulating members.

2. An electromagnetic flow meter as defined in claim 1 wherein $y_o = 0$ and the radius of said conduit is equal to a.

3. A fluid flowmeter as defined in claim 1, wherein the given direction of magnetic field intensity corresponds to a line tangent to a circle in said first of the families of circles defining the bipolar coordinate system and the field intensity in the given direction is proportional to the product $r_1 \cdot r_2$, where $r_1$ is the distance between the tangent point and the pole $(-a, 0)$ and $r_2$ is the distance between the tangent point and the pole $(a, 0)$.

4. A fluid flowmeter as defined in claim 3, wherein the detecting means has an extremely low input resistance.

5. A fluid flowmeter as defined in claim 4, further comprising means for dividing an output signal from the detecting means by a signal proportional to the electrical conductivity of the fluid.

* * * * *